(12) United States Patent
Jablonka

(10) Patent No.: US 9,816,264 B2
(45) Date of Patent: Nov. 14, 2017

(54) ADHERENT WATER VAPOUR PERMEABLE AIR AND MOISTURE BARRIER SHEET MATERIAL

(71) Applicant: Ewald Doerken AG, Herdecke (DE)

(72) Inventor: Marcus Jablonka, Vineland (CA)

(73) Assignee: Ewald Doerken AG, Herdecke (DE)

( * ) Notice: Subject to any disclaimer, the term of this patent is extended or adjusted under 35 U.S.C. 154(b) by 275 days.

(21) Appl. No.: 13/957,138

(22) Filed: Aug. 1, 2013

(65) Prior Publication Data
US 2015/0037548 A1 Feb. 5, 2015

(51) Int. Cl.
B32B 3/10 (2006.01)
E04B 1/62 (2006.01)
(Continued)

(52) U.S. Cl.
CPC .............. *E04B 1/625* (2013.01); *B32B 7/12* (2013.01); *B32B 27/12* (2013.01); *B32B 27/32* (2013.01); *B32B 37/1292* (2013.01); *C09J 7/0239* (2013.01); *C09J 7/04* (2013.01); *B32B 2037/1215* (2013.01); *B32B 2037/268* (2013.01); *B32B 2307/724* (2013.01); *B32B 2307/7242* (2013.01); *B32B 2419/00* (2013.01); *B32B 2419/06* (2013.01);
(Continued)

(58) Field of Classification Search
CPC ............................................ Y10T 428/24802
See application file for complete search history.

(56) References Cited

U.S. PATENT DOCUMENTS 4,761,324 A 8/1988 Rautenberg et al.
4,828,635 A 5/1989 Flack et al.
(Continued)

FOREIGN PATENT DOCUMENTS

DE 4322745 A1 1/1995
DE 19642252 A1 8/1997
(Continued)

OTHER PUBLICATIONS

Sharksin, Sharkskin Ultra's Multilayer Laminated Ice and Water Shield Design, retrieved from http://sharkskin.us/ on Oct. 25, 2013. products_ultra_sa.htm.
(Continued)

*Primary Examiner* — Christopher Polley

(57) ABSTRACT

A water vapour-permeable building sheet material, that may be adhered in overlapping relationship against a building structure, includes a water vapour permeable membrane having first and second opposing surfaces, wherein the surface energy of the second opposing surface is less than 35 mN/m; an adhesive layer that is vapour permeable, applied to the first face of the membrane; and an adhesive region applied to the second opposing surface. Two segments of the sheet material may be placed in overlapping relationship so that adhesive in the adhesive layer applied to the first face of the membrane of one of two segments adheres to the adhesive region applied to the second opposing face of the other of the two segments to form a substantially air impermeable boundary between the two segments, when overlapping, preventing lateral migration of air between the two segments. A building envelope may be so formed.

20 Claims, 9 Drawing Sheets

(51) Int. Cl.
- *C09J 7/04* (2006.01)
- *C09J 7/02* (2006.01)
- *B32B 37/12* (2006.01)
- *B32B 7/12* (2006.01)
- *B32B 27/12* (2006.01)
- *B32B 27/32* (2006.01)
- *B32B 37/26* (2006.01)

(52) U.S. Cl.
CPC ...... *C09J 2201/128* (2013.01); *C09J 2201/28* (2013.01); *C09J 2400/263* (2013.01); *Y10T 428/24802* (2015.01); *Y10T 428/24843* (2015.01)

(56) References Cited

U.S. PATENT DOCUMENTS

| | | | |
|---|---|---|---|
| 5,294,258 A | 3/1994 | Jarrell et al. | |
| 2004/0180195 A1* | 9/2004 | Macuga | B32B 7/12 428/343 |
| 2009/0038249 A1* | 2/2009 | Coulton | B32B 7/14 52/409 |
| 2011/0088334 A1* | 4/2011 | O'Rourke | E04D 12/002 52/95 |
| 2011/0274865 A1 | 11/2011 | Couturier | |
| 2011/0287216 A1* | 11/2011 | Groft | B32B 3/266 428/131 |

FOREIGN PATENT DOCUMENTS

| | | |
|---|---|---|
| DE | 19900656 A1 | 7/2000 |
| DE | 19904423 A1 | 8/2000 |
| DE | 69427306 T2 | 10/2001 |
| EP | 0288257 A2 | 10/1988 |
| EP | 0309073 A2 | 3/1989 |
| EP | 0570215 A2 | 11/1993 |
| WO | 2004082932 A1 | 9/2004 |

OTHER PUBLICATIONS

Nordson, 2002, "Nordson Porous Coat System", (Brochure) Nordson Corporation.
Jarrell, Curt, "Nordson: Porous Coat System", Textile World, 1992, Maclean Hunter Publishing.
Nordson, 1993, "Nordson Porous Coat System", (Brochure), Nordson Corporation.

* cited by examiner

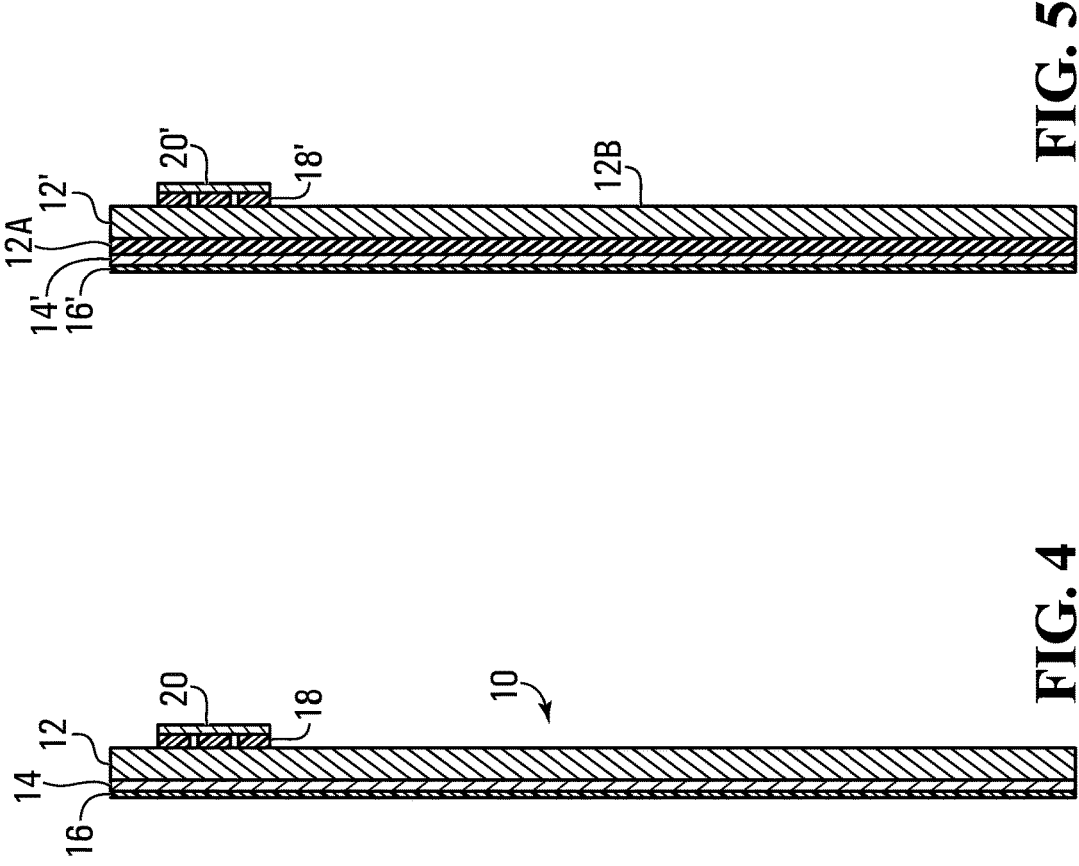
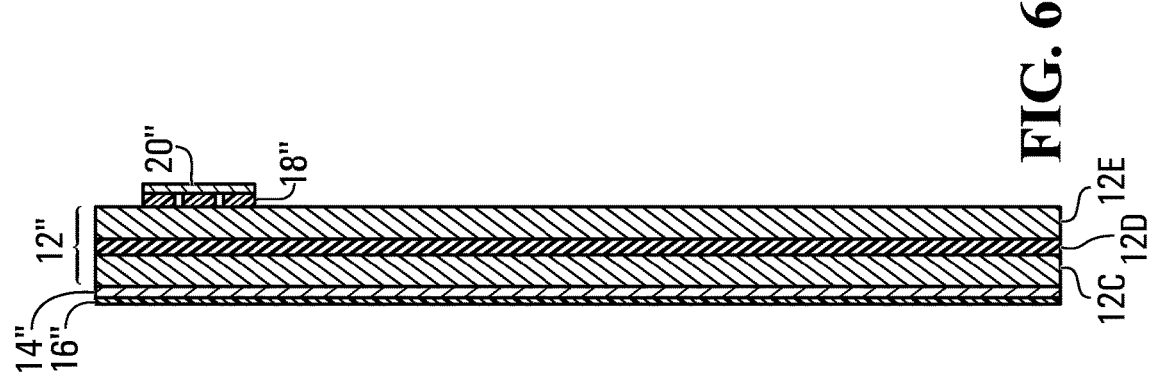

ADHERENT WATER VAPOUR PERMEABLE AIR AND MOISTURE BARRIER SHEET MATERIAL

FIELD

The present invention relates to building materials, and more particularly to air and water resistive barriers.

BACKGROUND

In construction, air barriers control air leakage into and out of the physical separator between the interior and exterior of a building. Known air barriers may be interposed between layers of the building structural wall. Air barriers are typically also water resistive and often take the form of membranes or house wraps and provide a defined air permeance rate.

Some air barriers are also water vapour permeable, allowing the passage of water vapour while preventing the passage of air. This is made possible because the molecular structure of water vapour allows it to pass through smaller pores than oxygen and nitrogen.

Water vapour permeable air barriers in membrane form are available from numerous manufacturers including Du Pont™ (Tyvek™ Homewrap) and Fiberweb™ (Typar™ Housewrap). Self-adhering water vapour permeable air barriers in membrane form are also available from numerous manufacturers including the Henry Company and WR Grace and Co.

Existing barrier membranes typically include a water vapour permeable membrane coated on one side by an adhesive. In order to form a a substantially airtight building enclosure, sheets of the membrane are affixed to the building in an adjacent or overlapping relationship to form a building envelope. The overlapping of membranes often does not work well, as the adhesive used to affix the barrier membranes does not adhere well to other membranes. Seam tape may instead be used to ensure continuity of the air barrier/building envelope, but is cumbersome.

Thus, properly positioning and adhering adjacent sheets of material in order to form an air tight envelope around the building structure remains a challenge.

Accordingly, new water vapour permeable air tight barriers allowing formation of a better sealed building envelope are desirable.

SUMMARY OF THE INVENTION

In accordance with an aspect, there is provided a water vapour-permeable building sheet material, that may be adhered in overlapping relationship against a building structure, comprising: a water vapour permeable membrane having first and second opposing surfaces, wherein the surface energy of the second opposing surface is less than 35 mN/m; an adhesive layer that is vapour permeable, applied to the first face of the membrane; an adhesive region applied to the second opposing surface; wherein two segments of the sheet material may be placed in overlapping relationship so that adhesive in the adhesive layer applied to the first face of the membrane of one of two segments may adhere to the adhesive region applied to the second opposing face of the other of the two segments to form a substantially air impermeable boundary between the two segments, when overlapping, preventing lateral migration of air between the two segments.

In accordance with another aspect, there is provided a method of applying a water vapour-permeable building sheet material to a building structure comprising: forming a plurality of sheet segments of the sheet material each of the sheet segments comprising a water vapour permeable membrane having first and second opposing surfaces; an adhesive applied discontinuously to the first face of the adhesive to provide uncovered regions, exposing the membrane to allow water vapour to permeate therethrough; an adhesive region applied to the second opposing surface, wherein the surface energy of the second opposing surface is less than 35 mN/m; placing two sheet segments of the sheet material in overlapping relationship on the building structure so that adhesive applied to the first face of the material of one of the two sheet segments may mate and bond with the adhesive region applied to the second opposing face of the other of the two sheet segments to form a substantially air impermeable boundary between the two sheet segments to prevent lateral migration of air between the two sheet segments.

In accordance with yet another aspect, there is provided a building envelope comprising a plurality of sheet segments of the sheet material each of the sheet segments comprising a water vapour permeable membrane having first and second opposing surfaces; an adhesive applied discontinuously to the first face of the adhesive to provide uncovered regions, exposing the membrane to allow water vapour to permeate therethrough; an adhesive region applied to the second opposing surface, wherein the surface energy of the second opposing surface is less than 35 mN/m; with two sheet segments of the sheet material placed in overlapping relationship on the building structure so that adhesive applied to the first face of the material of one of the two sheet segments may mate and bond with the adhesive region applied to the second opposing face of the other of the two sheet segments to form a substantially air impermeable boundary between the two sheet segments to prevent lateral migration of air between the two sheet segments.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIGS. 4 to 6 are cross-sectional views of exemplary sheet material;

DETAILED DESCRIPTION

Figure 1:
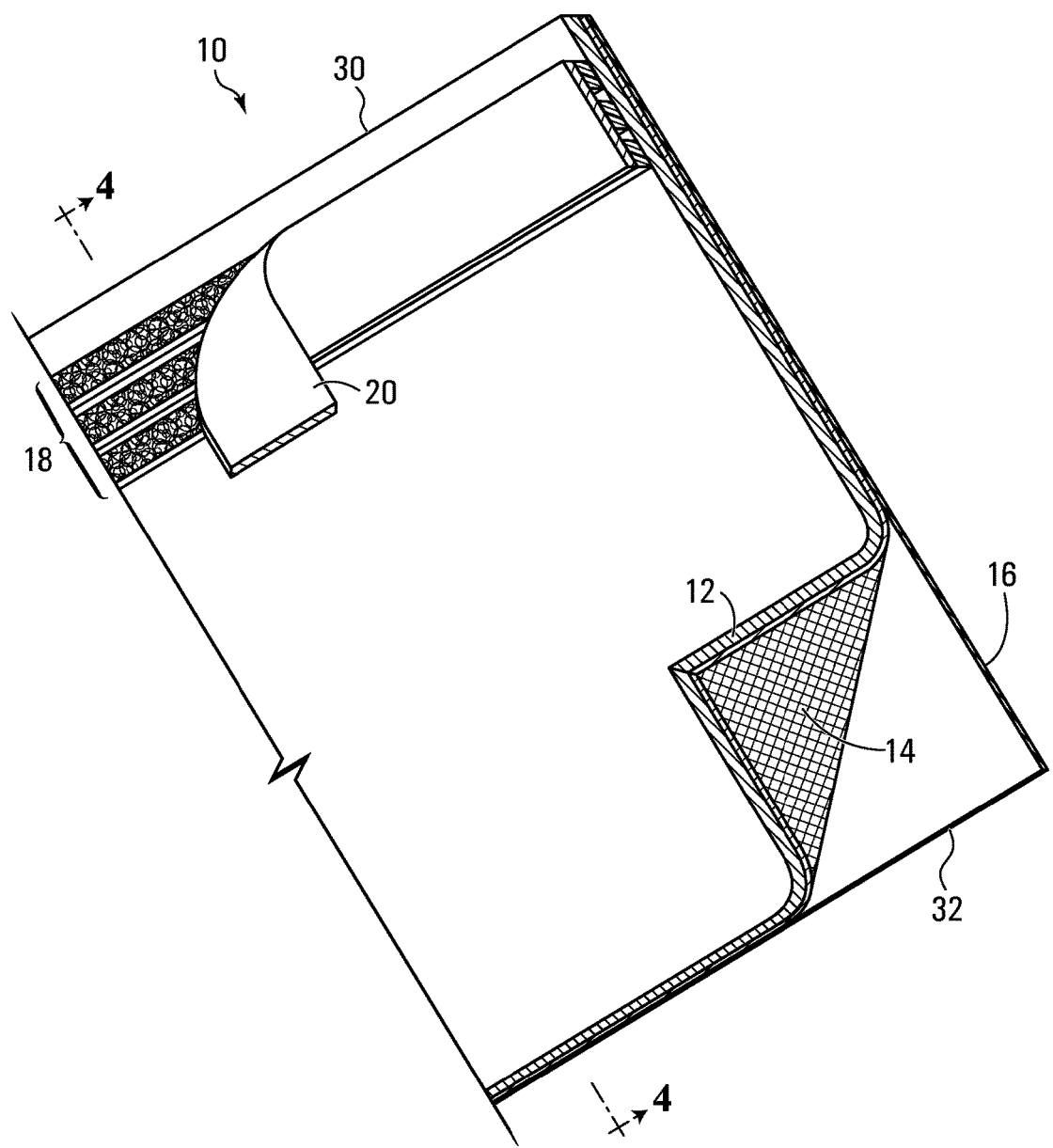
FIG. 1 is a perspective view of sheet material of water vapour permeable building membrane, exemplary of an embodiment of the present invention.

FIG. 1 is a perspective view of sheet material 10 of a water-resistive vapour permeable air barrier building membrane, exemplary of an embodiment of the present invention. Sheet material 10 is further shown in cross-section in FIG. 4.

As illustrated, sheet material 10 includes multiple layers. As depicted, sheet material 10 includes a membrane 12 having a discontinuous adhesive 14 applied on one side. Membrane 12 is vapour permeable, but air impermeable. It also acts as a water-resistive barrier. To that end, membrane 12 may have micro-pores, and be formed of fiber or film having pores ranging from about 0.01 to 10 μm in size.

Membrane 12 may be formed of a spun-bond polymer, such as spun bond polyethelyne, polypropelene, a suitable polymer film, a combination of spunbonded or needlepunched substrates with a polymeric coating , or the like. Membrane 12 may have any appropriate thickness, and is typically between about 0.1 mm and 5 mm thick. As will become apparent, in some embodiments, membrane 12 may comprise multiple layers.

An adhesive 14 is applied to the rear (i.e. first) face of membrane 12 using a roller or other applicator to provide a vapour permeable adhesive layer, as described below.

Example adhesives, suitable for use as adhesive 14 include solvent based adhesives; polymer dispersion adhesives (water based); pressure sensitive adhesives (e.g. butyl based hot-melt adhesives: ; or acrylate based polymer disposing adhesives, etc.); hot-melt adhesives (e.g. pressure sensitive adhesives); reactive adhesives (e.g. one-part adhesives with moisture or heat based curing, or multi-part adhesives); natural adhesives (e.g. protein-based bio-adhesives); acrylic polymer or other synthetic adhesives. Typically, a hot-melt adhesive or a polymer dispersion adhesive is used as adhesive 14.

Adhesive 14 may itself be vapour permeable, and may be applied to the entire rear side of membrane 12, or a portion thereof. Alternatively, adhesive 14 may be applied in a discontinuous layer—so as to leave uncovered regions on sheet material 10. Regions on membrane 12 not covered by adhesive 14 are exposed to allow the passage of water vapour through membrane 12, while regions covered by adhesive 14 prevent the passage of water vapour through membrane 12. The ratio of regions covered and uncovered by adhesive 14 influences the vapour permeability of membrane 12. In the depicted embodiment, adhesive 14 is applied in sets of generally diagonal stripes, with one set transverse to the other to form a diagonal checker pattern. Other patterns are, of course, possible and will be apparent to those of ordinary skill. Adhesive 14 allows membrane 12 to be adhered to a building structure. In an embodiment, between 1% and 99% of the surface of membrane 12 are covered by an adhesive 14, that is otherwise vapour impermeable.

Typically, adhesive 14 is applied when its viscosity is relatively low—typically when it is hot, or in a spray—but remains tacky after application to membrane 12. In this way, adhesive 14 may be used to adhere membrane 12 to another substrate—such as a building structure—simply by applying pressure.

A removable protective film 16 is lightly adhered to the layer of adhesive 14 for easy removal as sheet material 10 is installed on a building or structure as described below. Protective film 16 may be formed of paper or a thin polymer film or the like.

As will be generally, understood, for an adhesive such as adhesive 14 to be effective it must properly adhere to an underlying surface. As noted, adhesive 14 when hot or fluid is well suited to adhere to membrane 12. When cool, adhesive 14 remains tacky, and remains well suited to adhere to a building frame that is typically formed of wood. However, such adhesion depends largely upon surface phenomena—adhesive 14 must appropriately interact with the surfaces to be joined: it should make intimate contact with the surface. Different adhesives use different mechanisms to flow and achieve contact—structural adhesives are typically low viscosity liquids before curing, hot melt adhesives are heated to a flowable viscosity at application, and pressure sensitive adhesives make use of their unique viscoelastic nature to flow.

The ability of an adhesive to adhere to a particular surface is further strongly influenced by the nature of the surface. For example, the chemical make-up of the surface, the texture, porosity, and any contamination that coat the surface of the substrate (such as mold release agents, process additives which bloom to the surface, or contaminants from handling) can all affect an adhesive's ability to flow and achieve intimate contact.

Even if cleaned, some surfaces may inherently resist being wetted by an adhesive. This is often explained by a phenomenon referred to as surface energy, described above.

Surface energy is the excess energy that exists at the surface (as opposed to the bulk) of a solid. This excess energy exists because molecules at the surface cannot interact with as many like neighbours as molecules in the bulk are able to do; therefore, they have excess interaction energy. The surface energy of a solid varies with its chemical make-up. Metals and glass, for example, have a high surface energy and are easier to bond; whereas plastics have a lower surface energy and are harder to bond.

Hardest of all are low surface energy plastic, such as Polytetrafluoroethylene (PTFE) (Surface Energy 18.5 mN/m); Silicone 24 mN/m; Poly(vinylidene fluoride) 25; Polyethylene (PE) 31 mN/m; Polypropylene (PP) 31 mN/m; Polystyrene 33 mN/m.

Surface tension exists because molecules in the bulk liquid are in a lower energy state than at the surface. The interaction of liquid adhesive on a solid surface depends on the relative surface energy of the adhesive and solid. If the adhesive has a higher surface energy the adhesive will prefer to maintain its spherical form. In such circumstances, an adhesive will not spread and make intimate contact with the surface to be bonded; rather, the molecules of the liquid adhesive will tend to remain associated with themselves, resulting in lower bond strengths. If, however, the surface energy of the adhesive is less than that of the substrate the adhesive will spread, thus making the intimate contact necessary for good bonding.

Typically membrane 12 (or at least its forward face) is made of a material having low surface energy (e.g. below 35 mN/m). Example materials and their tabulated surface energies are Polyethylene (PE) 31 mN/m; Polypropylene (PP) 31 mN/m. Other materials will be apparent to those of ordinary skill. Thus, due to the low surface energy, membrane 12 is inherently difficult to adhere to.

Not surprisingly, adhesives that generally adhere very well to common construction surfaces like plywood, OSB, concrete, glass, aluminium, etc. will not adhere very well to materials having such low surface energy. While such adhesive adhere well to low surface energy materials when applied in the factory (due to the fact that the adhesive is being applied as a hot-melt, in hot and liquid form, or as a dispersion adhesive in dispersion form where it has a low viscosity and can easily penetrate into the surface texture of the membrane), they will typically not adhere as well to such surfaces during field installation. Simply, the adhesive now has a higher viscosity and cannot easily penetrate into the surface texture of the membrane.

Low adhesion strength in areas where sheet material 12 overlaps with other sheet material 12 can lead to separation between the segments of the sheet material, compromising the continuity of the air barrier layer, as described below.

A further adhesive region in the form of a strip 18 is applied to the front side of membrane 12, proximate a first edge 30 of sheet material 10. Strip 18 extends along the length of sheet material 10, but only occupies a fraction (e.g. between 2% and 5%) of the front of sheet material 10. Strip 18 extends along the length of sheet material 10, generally parallel to edge 30. Strip 18 may be formed of one continuous stripe of adhesive, or multiple adjacent thin stripes, or any other suitable pattern. Again, a hot melt adhesive, pressure sensitive adhesive, or dispersion adhesive, like that used as adhesive 14 may be used to form strip 18. A further removable protective film 20, often referred to as a release liner, covers strip 18, and may be removed as sheet material 10 is installed, again, as described below. Again, removable protective film 20 may be formed of paper or a thin polymer film.

Sheet material 10 is typically of indefinite length, and extends width-wise between edges 30 and 32. In a typical embodiment sheet material 10 may be rolled and cut widthwise from edge to edge (i.e. from edge 32 to edge 30) into sheet segments of defined length based on application. The width of sheet material 10 is also arbitrary—and may for example be between about 1.0 m and 3.0 m. Sheet material 10 of width 1.5 m is convenient for transport and handling. Strip 18 generally extends along the entire length of sheet material 10, and, for a 1.5 m wide sheet, may have a width of between about 2 cm and 25 cm, and may be spaced between about 2 and 10 cm from edge 30.

In other embodiments membrane 12 may be a multi-layer membrane, as for example, exemplified in FIGS. 5 and 6. As illustrated in FIG. 5, a membrane 12' may be formed of a thin film 12a having micro-pores (having a mean diameter of several microns), or otherwise of sufficient size to allow water vapour to pass. A discontinuous layer of adhesive 14' (like adhesive 14) may be applied to thin film 12a. Again, a thin protective sheet 16' may be removably applied to adhesive 14'. A spun bond layer 12b (like membrane 12) is further bonded to thin film 12a to form membrane 12'. Again an adhesive strip 18' like strip 18 may be applied to the face of spun bond layer 12b, and covered by protective film 20' (like film 20).

In a further embodiment, depicted in FIG. 6, membrane 12" is formed of a film 12e sandwiched between two spun bond layers 12c and 12d. Again an adhesive stripe 18" like stripe 18 may be applied to the face of spun bond layer 12'. A discontinuous layer of adhesive 14' (like adhesive 14) may be applied to thin film 12c. A thin protective sheet 16" may be removably applied to adhesive 14". An adhesive strip 18" (like strip 18) may be applied to the face of spun bond layer 12d, and covered by a removable thin film 20" (like film 20).

Figure 9:
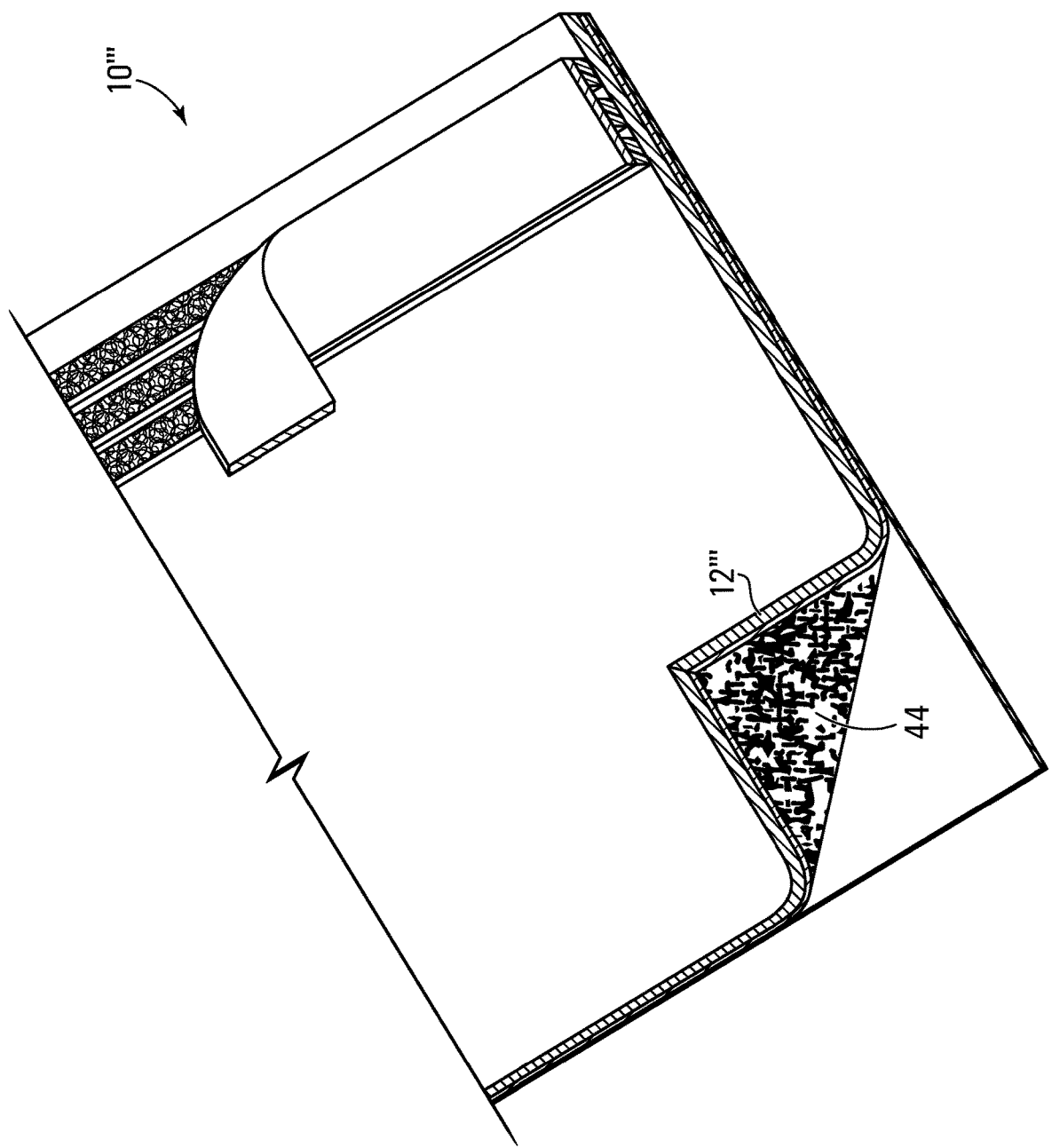
FIG. 9 is a perspective view of water vapour permeable building membrane exemplary of another embodiment of the present invention.

In yet a further embodiment depicted in FIG. 9 adhesive 14 (FIG. 1) may be replaced with a puddle coated adhesive 44 on sheet material 10''' creating random regions of membrane 12''' (like membrane 12 or 12' or 12") covered by adhesive 44. Again, the size and relative distribution of regions not covered by adhesive 44, and the vapour permeability of adhesive 44 will influence the overall vapour permeability of the resulting sheet material 10'''. Again, between 1% and 99% of the surface of membrane 12''' may be covered with adhesive 44.

Figure 2:
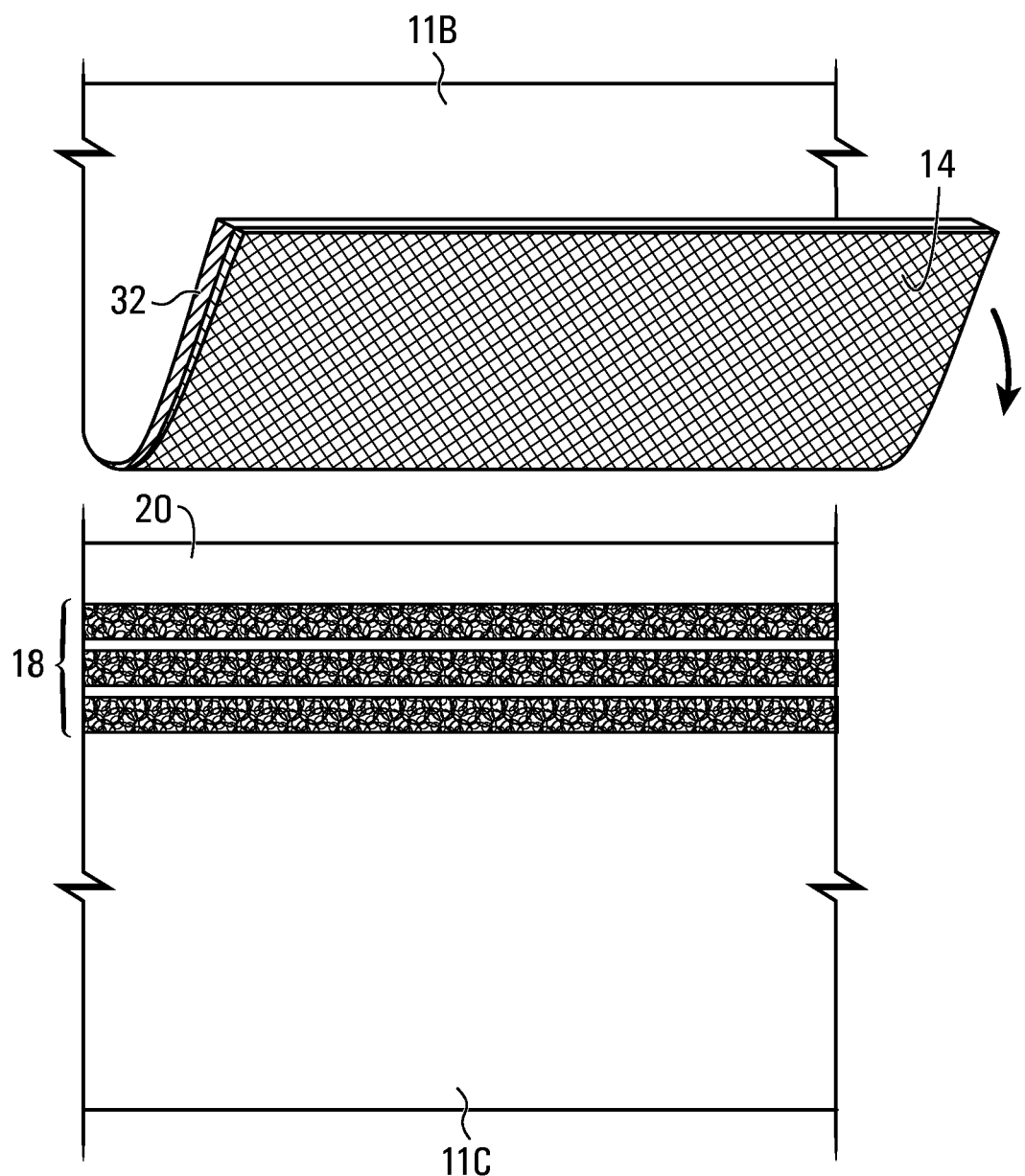
FIG. 2 is a schematic view of the overlay of two sheet segments of the sheet material of FIG. 1.
Figure 3:
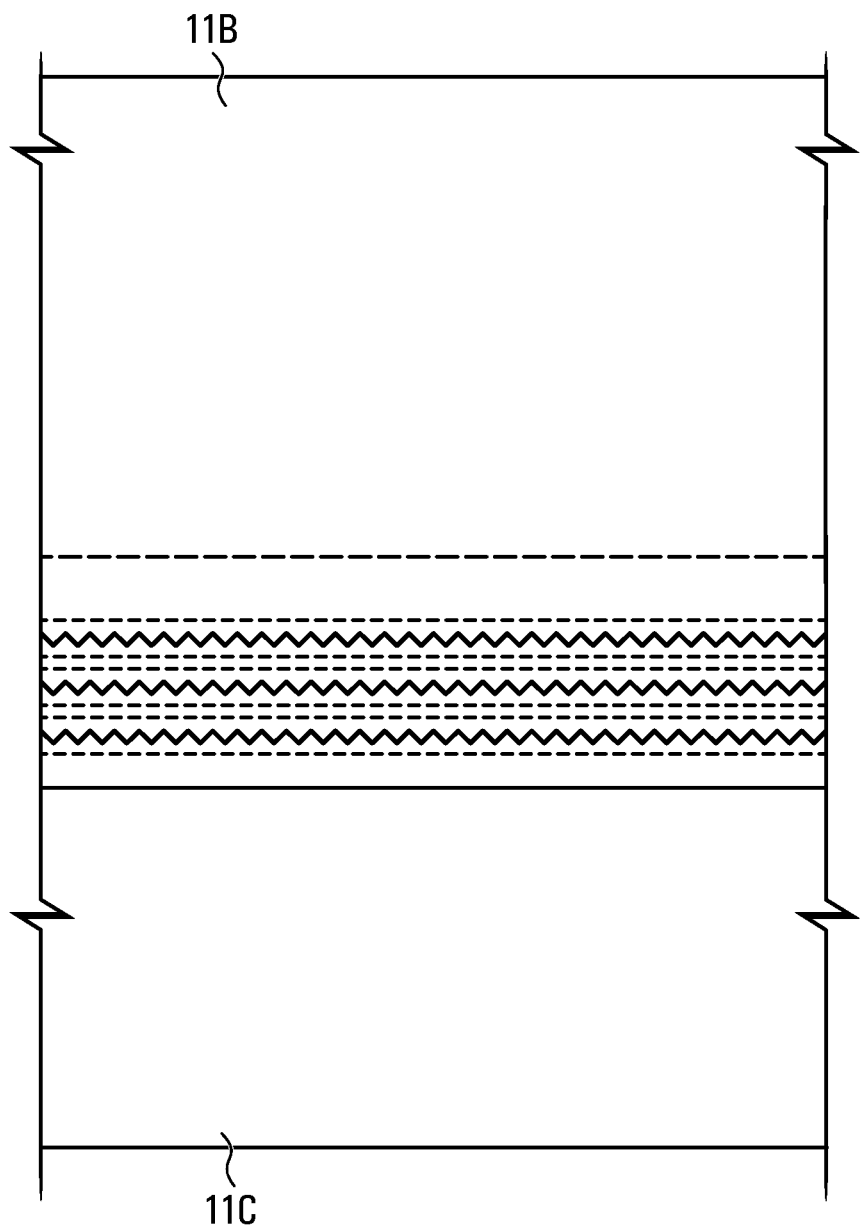
FIG. 3 is a schematic view of the adhesive interface between two sheet segments of FIG. 2.
Figure 7:
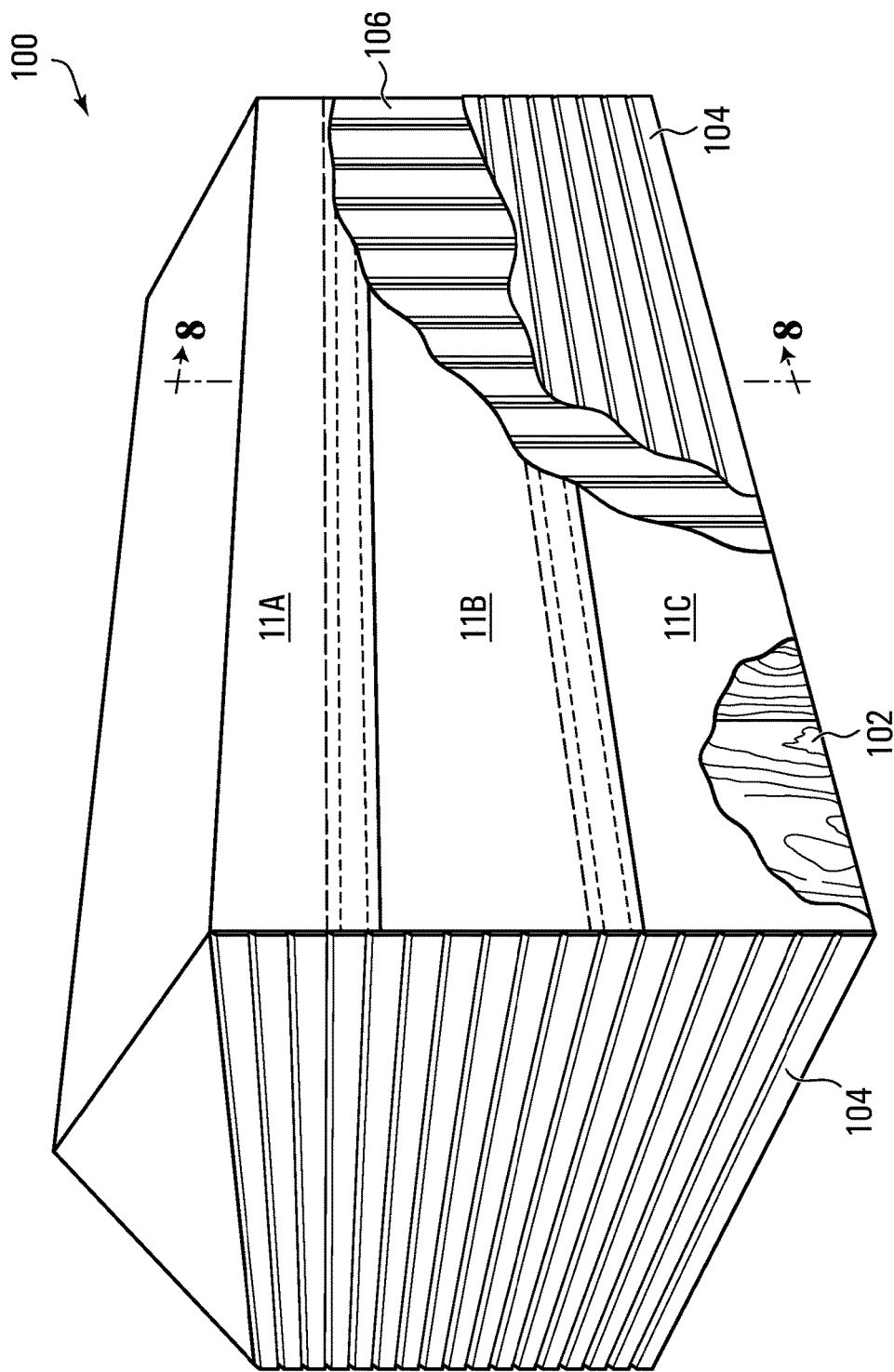
FIG. 7 is a perspective view of a building structure with a water vapour permeable building membrane applied.

Sheet material 10 (or sheet material 10', 10" or 10''') may be installed on a building, as best illustrated in FIGS. 2, 3 and 7.

As illustrated in FIG. 7, sheet material 10 may be unrolled, cut along its width, and applied to a building 100 in generally vertically or horizontally extending sheet segments 11a, 11b, 11c, etc. (individually and collectively strip segments 11) to form a building envelope. Typically sheet segments 11 are applied to a frame 102 of building 100, beneath an outer cladding 104. As illustrated in FIGS. 2, 3 and 7 and 8, sheet segments 11 are placed in side by side, overlapping relationship.

Figure 8:
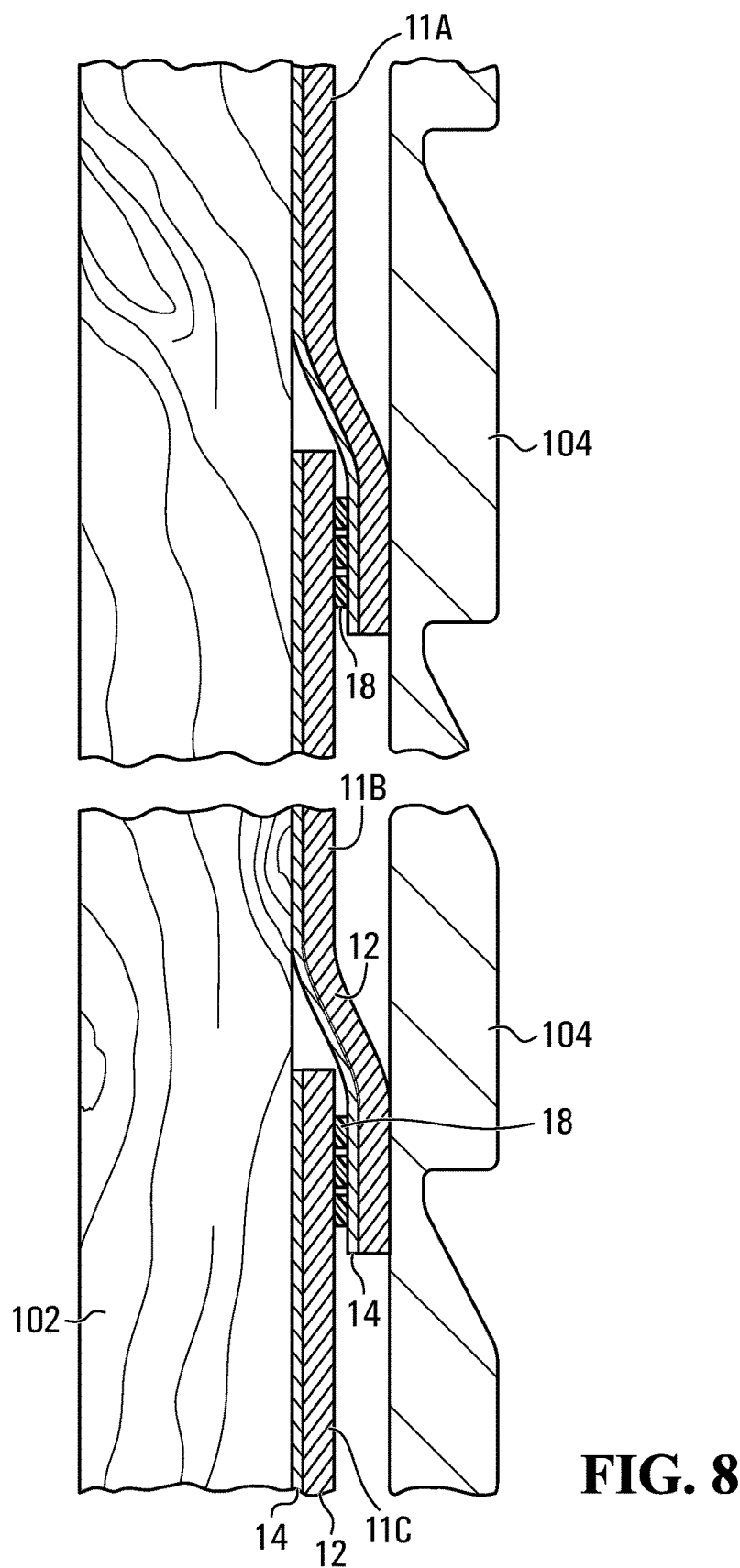
FIG. 8 is a cross-sectional view of the building structure of FIG. 7.

Specifically, as illustrated in FIGS. 2 and 8, after cutting sheet material 10 into a sheet segment 11c, protective film 20 is removed from sheet segment 11c, and sheet segment 11c is applied to frame 102 (FIG. 7). Sheet segment 11c may be applied proximate the bottom of a face of frame 102. A roller or similar tool (not shown) may be used to press on membrane 12 of sheet segment 11c to tightly adhere the exposed adhesive 14 of sheet segment 11c to the building structure.

Once affixed to frame 102, protective layer 20 of strip 18 of segment 11c may be removed, and a further sheet segment 11b may be applied to frame 102. In particular, edge 32 of sheet segment 11b is placed to overlap with sheet segment 11c. The overlap should be sufficient to cover the adhesive in strip 18 of sheet segment 11c. In this way, adhesive 14 on the bottom of sheet segment 11b adheres to adhesive strip 18 on the face of sheet segment 11a.

The front surface of each of membranes 12, 12', 12' and 12''' has a surface tension less than about 40 mN/m, making adherence by adhesive 14 thereto difficult.

Conveniently, adhesive 14 of one sheet segment 11c and adhesive 18 of sheet segment 11b form a boundary that extends along the length of the sheet segment 11b, best illustrated in FIGS. 3 and 8, that seals adjacent sheet segments to each other, to prevent lateral migration of air out of the building envelope between sheet segments 11, along their lengthwise extending edges. In the absence of adhesive strip 18, adherence of adhesive 14 to the face (i.e. directly to membrane 12) of an adjacent sheet segment would be imperfect, because of the low surface energy of the front surface of membrane 14 to which adhesive 14 would be adhering.

As will be appreciated by those of ordinary skill, ICC AC38 requires that the air leakage rate of an air barrier membrane material not exceed 0.02 l/s/m$^2$ at 75 Pa when tested according to ASTM E-2178. Likewise, the Air Barrier Association of America (ABAA) requires the air leakage rate of a wall assembly with an air barrier membrane not to exceed 0.2 l/s/m$^2$ at a pressure difference of 75 Pa in both directions after wind pressure conditioning when tested according to ASTM E-2357.

While the criteria set out in the ASTM E-2178 test are relatively easy to achieve (only the membrane itself gets tested, so no installation details like overlaps are being considered), the requirement for the assembly test as per ASTM-E2357 is much harder to achieve since overlaps of the air barrier membrane as well as a number of different penetrations are mandated in the test method.

Conveniently, a building envelope as described above may meet both ASTM E-2178 and ASTM-E2357 criteria.

Figure 10:
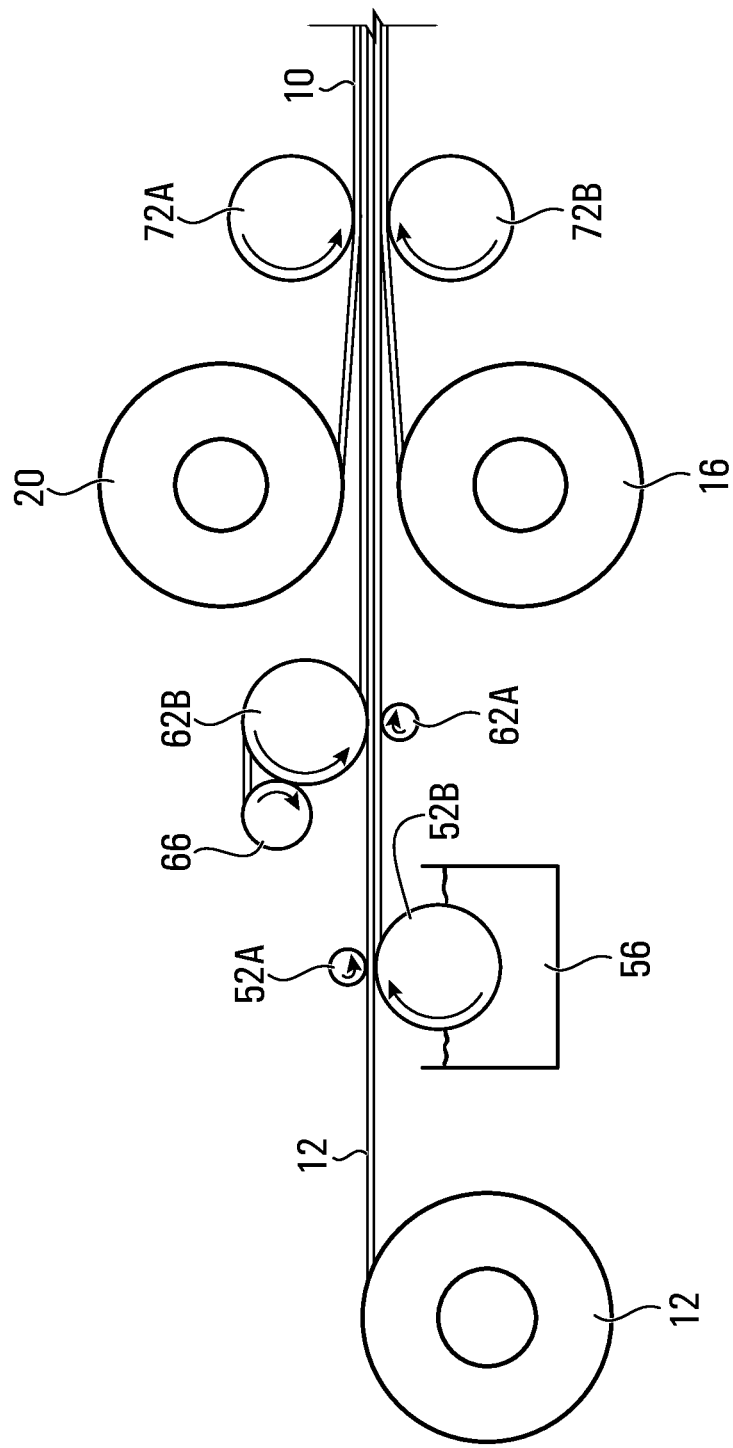
FIG. 10 illustrates a continuous sheet formation arrangement that may be used to form the sheet material of FIGS. 1 to 6.
Figure 12:
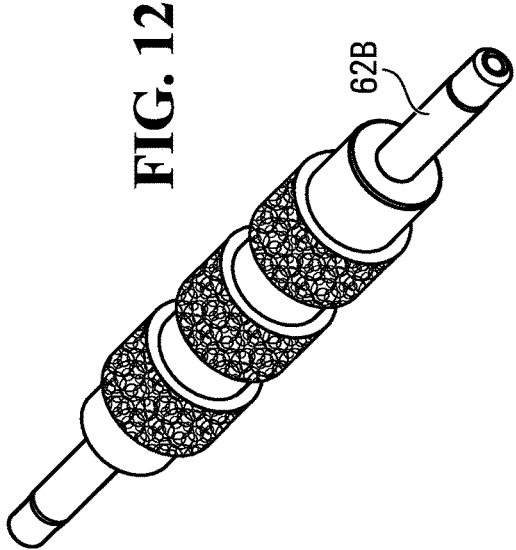
FIGS. 11 and 12 are perspective views of rollers used in the arrangement of FIG. 10.
Figure 11:
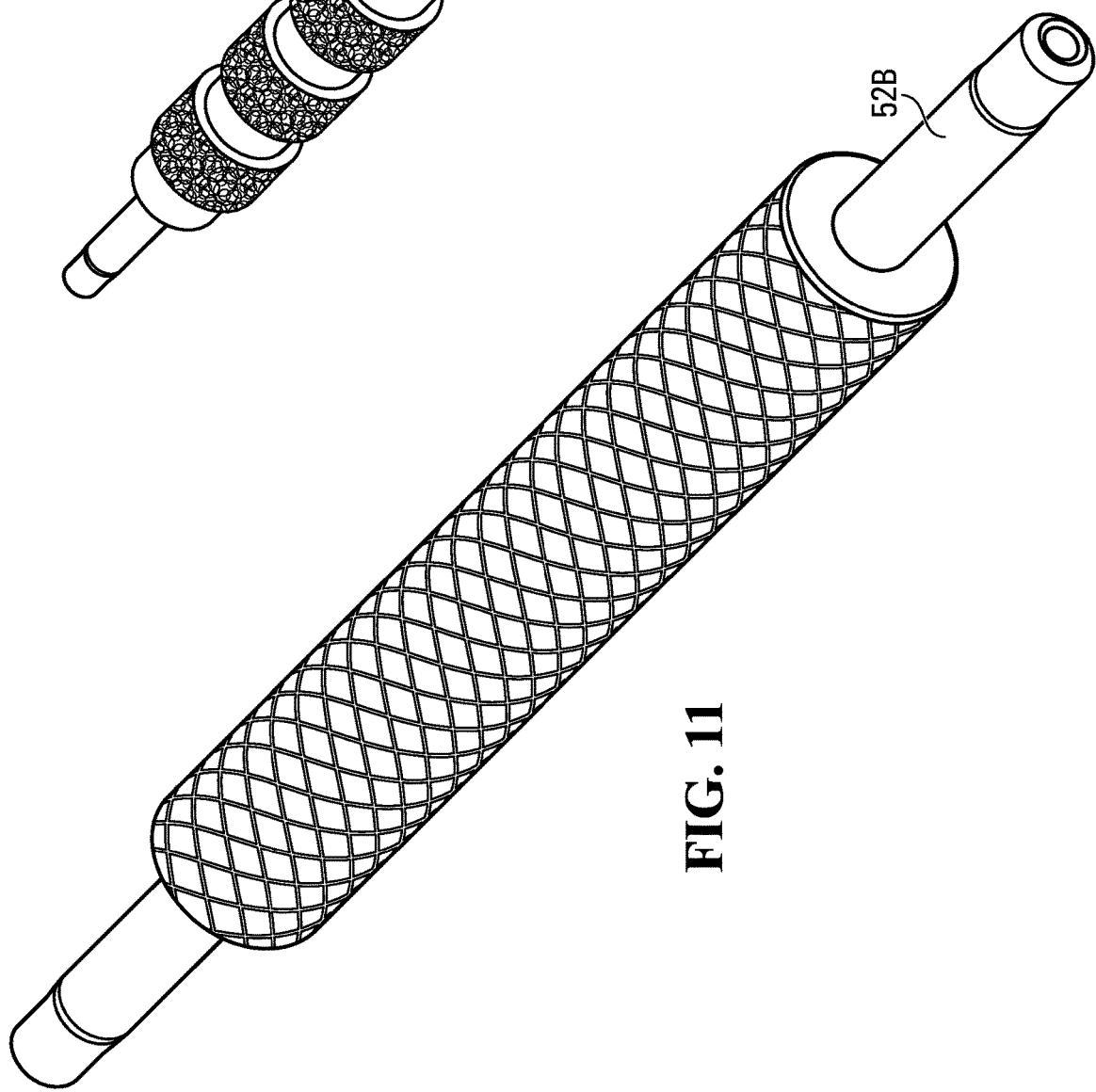

Sheet material 10 may be formed using conventional sheet forming rollers as illustrated in FIG. 10. As illustrated, membrane 12 is fed from a roll of material through rollers 52a and 52b. Roller 52b has a patterned applicator surface 54 illustrated in FIG. 11. Applicator surface 54 ensures that hot melt adhesive 14 (stored in tank 56) is applied to only a portion of the bottom surface of membrane 12. Rollers 62a and 62b apply adhesive strip 18 to the top surface of membrane 12. Roller 62b depicted in FIG. 12 includes an applicator to form adjacent stripes. Protective sheets 16 and 20 are fed from rolls and applied downstream by rollers 72a and 72b, to cover adhesive 14 and strip 18.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A water vapour-permeable building sheet material comprising segments installed in overlapping relationship against a building structure, wherein each of said segments comprises:
    a water vapour permeable membrane having first and second opposing surfaces, wherein the surface energy of said second opposing surface is less than 35 mN/m;
    an adhesive layer that is vapour permeable, and pre-applied to substantially the entirety of said first opposing surface prior to installation of the water vapour permeable membrane;
    an adhesive region comprising at least one strip of adhesive pre-applied to the second opposing surface, to extend lengthwise parallel and proximate its edge prior to installation of the water vapour preamble membrane;
    wherein at least one strip of adhesive of said adhesive region of a first segment of said sheet material bonds to the adhesive layer of a second segment of said sheet material when said second segment of said sheet material is placed in overlapping relationship with the at least one strip of adhesive of said adhesive region of said first segment, without precise alignment, to form a substantially air impermeable boundary between said first segment and said second segment, preventing lateral migration of air between said first segment and said second segment.

2. The sheet material of claim 1, wherein said adhesive layer comprises an adhesive pre-applied discontinuously to said first opposing surface to provide uncovered regions, exposing said water vapour permeable membrane to allow water vapour to permeate therethrough.

3. The sheet material of claim 2, wherein said adhesive layer is applied in a geometric pattern to cover between 1% and 99% of said first opposing surface.

4. The sheet material of claim 1, wherein said adhesive layer comprises a hot melt adhesive.

5. The sheet material of claim 4, wherein said adhesive layer comprises at least one of a solvent based adhesive; a polymer dispersion adhesives; a pressure sensitive adhesives; a butyl based adhesive; an acrylate based polymer adhesive; a hot-melt adhesive; a reactive adhesive; a natural adhesive; or an acrylic polymer.

6. The sheet material of claim 1, wherein said adhesive region comprises a strip of adhesive pre-applied generally parallel to a lengthwise extending edge of said sheet material.

7. The sheet material of claim 1, wherein said adhesive region comprises a plurality of parallel strips of adhesive.

8. The sheet material of claim 1, wherein said adhesive region comprises a hot melt adhesive.

9. The sheet material of claim 1, further comprising a removable film, coating said adhesive layer on said first opposing surface.

10. The sheet material of claim 1, further comprising a removable film, coating said adhesive region on said second opposing surface.

11. The sheet material of claim 1, wherein said second opposing surface is formed of one of Polyethylene; Polypropylene (PP).

12. The sheet material of claim 1, wherein said water vapour permeable membrane comprises a spun-bond layer.

13. The sheet material of claim 1, wherein said water vapour permeable membrane comprises a porous film.

14. The sheet material of claim 1, wherein said water vapour permeable membrane comprises a second spun bond layer.

15. The sheet material of claim 1, wherein the surface tension of said second opposing surface is less than 32 mN/m.

16. A building envelope comprising a plurality of sheet segments of sheet material each of said sheet segments comprising
    a water vapour permeable membrane having first and second opposing surfaces;
    an adhesive pre-applied discontinuously to said first opposing surface of said water vapour permeable membrane to provide uncovered regions, exposing said water vapour permeable membrane to allow water vapour to permeate therethrough;
    an adhesive region pre-applied to the second opposing surface, wherein the surface energy of said second opposing surface is less than 35 mN/m;
    wherein said sheet segments of said sheet material are placed in overlapping relationship on a building structure such that the adhesive pre-applied to said first opposing surface of a first of said sheet segments mates and bonds with the adhesive region pre-applied to said second opposing surface of an adjacent one of said sheet segments to form a substantially air impermeable boundary between said adjacent sheet segments to prevent lateral migration of air between said adjacent sheet segments, so that the air leakage of said building envelope does not exceed 0.2 l/s/m$^2$ at a pressure difference of 75 Pa after wind pressure conditioning when tested in accordance with ASTM E-2357.

17. The building envelope of claim 16, wherein said adhesive is applied in a geometric pattern to cover between 1% and 99% of said first opposing surface.

18. The building envelope of claim 17, wherein said adhesive comprises at least one of a solvent based adhesive; a polymer dispersion adhesive; a pressure sensitive adhesives; a butyl based adhesive; an acrylate based polymer adhesive; a hot-melt adhesive; a reactive adhesive; a natural adhesive; or an acrylic polymer.

19. The building envelope of claim 16, wherein said adhesive region comprises a strip of adhesive generally parallel to a lengthwise extending edge of said sheet material.

20. A water vapour-permeable building sheet material comprising segments adhered in overlapping relationship against a building structure, wherein each of said segments comprises:
- a water vapour permeable membrane having first and second opposing surfaces, wherein the surface energy of said second opposing surface is less than 35 mN/m;
- an adhesive layer that is vapour permeable, pre-applied to cover the area of said first opposing surface of said water vapour permeable membrane, with between 1% and 99% of adhesive;
- an adhesive region pre-applied to the second opposing surface generally parallel to a lengthwise extending edge of said sheet material;
- a first removable film, coating said adhesive on said first opposing surface;
- a second removable film, coating said adhesive region on said second opposing surface;
- wherein at least one strip of said adhesive region of a first segment of said sheet material bonds to the adhesive layer of a second segment of said sheet material when said second segment of said sheet material is placed in overlapping relationship with the at least one strip of said adhesive region of said first segment, without precise alignment, to form a substantially air impermeable boundary between said first segment and said second segment, preventing lateral migration of air between said first segment and said second segment.

* * * * *